United States Patent
Otto

(10) Patent No.: US 8,906,440 B2
(45) Date of Patent: Dec. 9, 2014

(54) COFFEE FILTER BASKET

(75) Inventor: Jay D. Otto, Dayton, OH (US)

(73) Assignee: Javajig, LLC, Orlando, FL (US)

(*) Notice: Subject to any disclaimer, the term of this patent is extended or adjusted under 35 U.S.C. 154(b) by 212 days.

(21) Appl. No.: 13/161,785

(22) Filed: Jun. 16, 2011

(65) Prior Publication Data

US 2012/0321769 A1    Dec. 20, 2012

(51) Int. Cl.
  *A23L 1/28* (2006.01)
  *A23F 5/00* (2006.01)
  *A47J 31/06* (2006.01)

(52) U.S. Cl.
  CPC .......... *A47J 31/0642* (2013.01); *A47J 31/0626* (2013.01)
  USPC ........................................................ 426/433

(58) Field of Classification Search
  USPC ......... 426/433, 109, 110, 112, 115, 126, 127, 426/77, 84
  See application file for complete search history.

(56) References Cited

U.S. PATENT DOCUMENTS

| | | | | |
|---|---|---|---|---|
| 4,595,099 | A | * | 6/1986 | Zaruba et al. ................. 206/525 |
| 4,963,262 | A | * | 10/1990 | Johnstone ..................... 210/474 |
| 5,738,786 | A | | 4/1998 | Winnington-Ingram |
| 6,189,438 | B1 | | 2/2001 | Bielfeldt |
| 6,645,537 | B2 | | 11/2003 | Sweeney |
| 2002/0020659 | A1 | | 2/2002 | Sweeney |
| 2002/0078831 | A1 | * | 6/2002 | Cai ................................. 99/295 |
| 2009/0056557 | A1 | * | 3/2009 | Lin ................................. 99/323 |
| 2009/0229470 | A1 | * | 9/2009 | Dorfmueller .................. 99/295 |
| 2010/0288131 | A1 | | 11/2010 | Kilber |
| 2010/0288133 | A1 | | 11/2010 | Litzka |

FOREIGN PATENT DOCUMENTS

| | | |
|---|---|---|
| AT | 179314 T | 5/1999 |
| AT | 281372 T | 11/2004 |
| AT | 503943 | 2/2008 |
| AT | 503943 B1 | 2/2008 |
| AT | 476896 T | 8/2010 |
| AU | 6399098 | 9/1998 |
| AU | 3702401 A | 8/2001 |
| AU | 2001237024 B | 5/2006 |
| CA | 2284092 | 9/1998 |
| CA | 2400033 A1 | 8/2001 |
| CN | 1419513 A | 5/2003 |

(Continued)

OTHER PUBLICATIONS

Kasahara, Oct. 1995, Machine Translation of JP 07-255597.*

*Primary Examiner* — Humera Sheikh
*Assistant Examiner* — Tynesha McClain-Coleman
(74) *Attorney, Agent, or Firm* — R. William Graham

(57) ABSTRACT

A coffee filter basket includes a filter retainer having an outer shell with an upper end having open top and a bottom including an opening, an insert having an upper collar of a less than the diameter than the upper end of the retainer to fit therein and having a lower extension which when a filter is disposed within the retainer and the insert is disposed within the filter, the insert press-fits within the retainer to retain the filter adjacent the retainer shell, and a removable top having an outer perimeter lip portion of at least that of the diameter of the upper end of the retainer and a lower collar portion of a diameter less than the diameter of the upper collar and configured to press-fit therein to secure the insert in the retainer, wherein the removable top has an opening. A method of use is provided.

9 Claims, 2 Drawing Sheets

(56) References Cited

FOREIGN PATENT DOCUMENTS

| | | |
|---|---|---|
| CN | 1187234 C | 2/2005 |
| DE | 29608390U U1 | 8/1996 |
| DE | 60106879T T2 | 4/2006 |
| DK | 865749 T | 11/1999 |
| EP | 0865749 | 9/1998 |
| EP | 1263661 A1 | 11/2002 |
| EP | 2063744 | 3/2009 |
| ES | 2134040 T | 9/1999 |
| ES | 2350617 T3 | 1/2011 |
| GB | 2301021 | 11/1996 |
| JP | 07255597 A * | 10/1995 |
| JP | 2004500199 | 1/2004 |
| JP | 3742344 B2 | 1/2006 |
| NZ | 520731 | 7/2005 |
| WO | WO9839997 | 9/1998 |
| WO | WO0160712 | 8/2001 |
| WO | WO2008028212 | 3/2008 |

\* cited by examiner

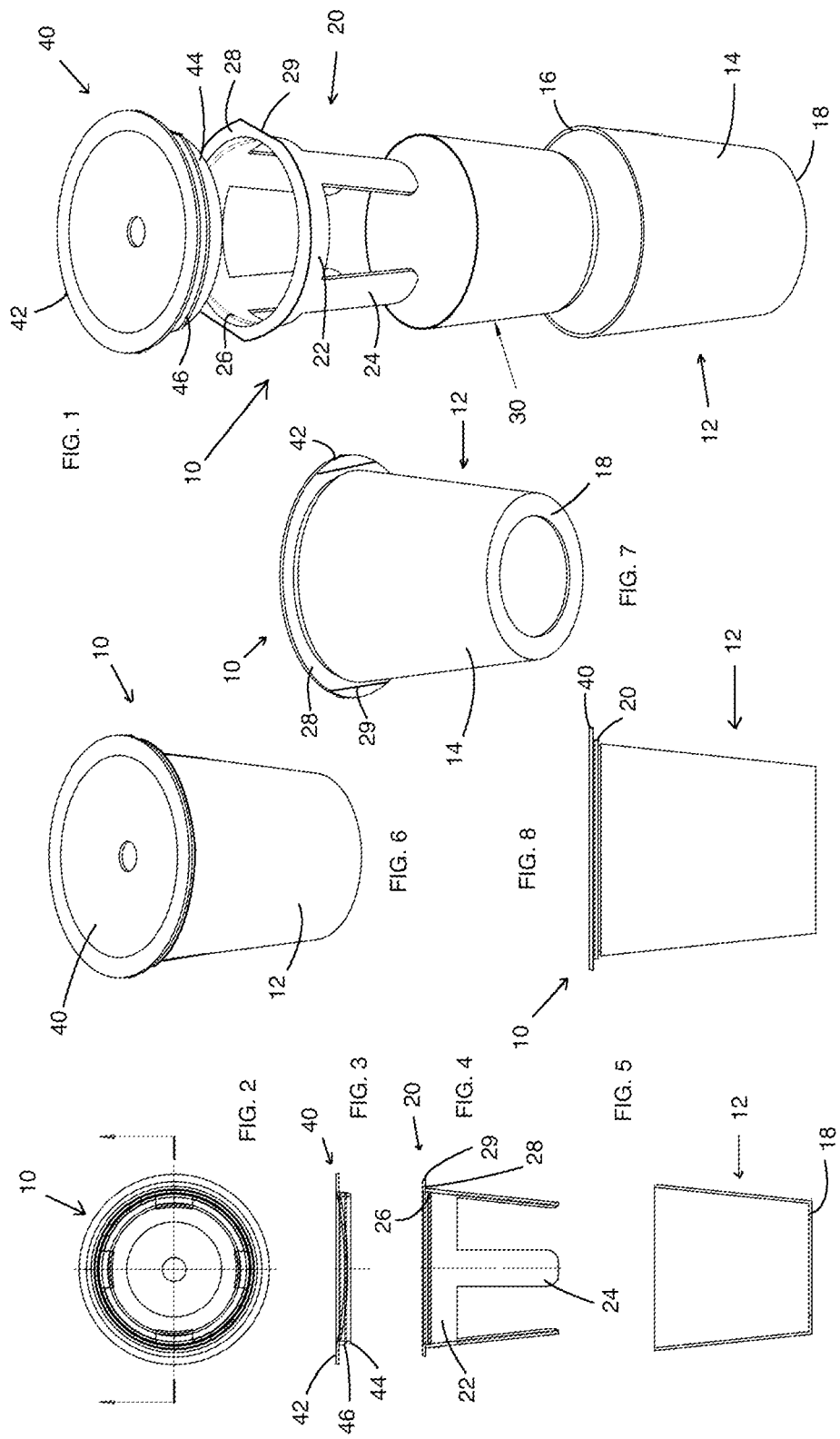

COFFEE FILTER BASKET

FIELD OF THE INVENTION

The present invention relates to electric coffee brewing machines. More particularly, the present invention relates to a novel single-use, reusable brew basket for an electric coffee maker.

BACKGROUND OF THE INVENTION

Drip-type electric brewing machines have been used as an efficient means for making coffee. The coffee brewing machine typically has a cold water reservoir, an electric resistance heating element for heating the water, and a reusable plastic brew basket for holding ground coffee in a paper coffee filter. To make coffee, cold water is poured into the water reservoir and ground coffee is placed in a coffee filter, which is in turn placed in the brew basket. The cold water is heated by the electric heating element, and the heated water then saturates the ground coffee. The brewed coffee then drips out into a pot below the brew basket. The paper filter and used coffee grounds are taken out of the plastic brew basket and discarded. Then, the brew basket and coffee pot are cleaned for re-use.

Recently, there has been a trend to provide a single use disposable brew basket for a drip-type electric coffee brewing machine that is designed for brewing a single cup of coffee directly into a coffee cup. This was designed under the thought of providing not only a fresh cup of coffee on demand, but also as a more efficient use of the coffee. Another system provided a cartridge which is introduced in a mechanism which included a cartridge receiving portion. Using the mechanism, the first and second portions may be moved to an open position in which the beverage cartridge may be placed in the cartridge receiving portion, and subsequently closed in preparation for forming a beverage. A trendy brand of cartridge has been introduced by Keurig, Inc. which is a single use coffee cartridge works within its beverage cartridge receiver. This is seen in U.S. Pat. No. 7,513,192. While this system is desirable, there remains a need to provide a reusable single serving basket which improves the field.

SUMMARY OF THE INVENTION

It is an object of the present invention to improve the efficiency of drip-type electric coffee.

It is another object to improve the efficiency of single use coffee machine.

It is a more specific object of the invention to provide a single-use, reusable brew basket that includes an integral single-use coffee filter pack. Still another object of the invention is to provide a single-use, disposable brew basket for a drip-type electric coffee brewing machine that is designed for brewing a single cup of coffee directly into a coffee cup.

One aspect of the invention includes a coffee filter basket which includes:

a filter retainer having an outer shell with an upper end having open top and a bottom including an opening therein;

an insert having an upper collar of a less than the diameter of the upper end of the retainer to fit therein and having a lower extension which when a filter is disposed within the retainer and the insert is disposed within the filter, the insert press-fits within the retainer to retain the filter adjacent the retainer shell; and a removable top having an outer perimeter lip portion of at least that of the diameter of the upper end of the retainer and a lower collar portion of a diameter less than the diameter of the upper collar and configured to press-fit therein to secure the insert within the retainer, wherein the removable top has an opening therethrough. In this way, a single-use filter can be employed with coffee therein and discarded after its use. The upper collar also includes a peripheral lip of a diameter at least that of the upper end of the retainer, and preferably larger, to aid in removal of the insert. Further, the lower collar portion of the top and the collar of the insert can be formed with a complementary detent mechanism to snap fit together and secure the two together for use and removal. An edge of either of the peripheral lip of the insert or the lip portion of the top can be recessed or extended to aid in separation of the two once connected.

A method of brewing a single cup of coffee comprises the steps of: providing an electric coffee brewing machine; providing a single-use, reusable brew basket a filter retainer having an outer shell with an upper end having open top and a bottom including an opening therein, an insert having an upper collar of a less than the diameter than the upper end of the retainer to fit therein and having a lower extension which when a filter is disposed within the retainer and the insert is disposed within the filter, the insert press-fits within the retainer to retain the filter adjacent the retainer shell, and a removable top having an outer perimeter lip portion of at least that of the diameter of the upper end of the retainer and a lower collar portion of a diameter less than the diameter of the upper collar and configured to press-fit therein to secure the insert within the retainer, wherein the removable top has an opening therethrough, inserting a single-use coffee filter into the retainer, placing the insert into the filter in a manner to cause the same to be press-fit against the retainer, pouring coffee into the filter, connecting the removable top onto the retainer such that the lower collar portion press-fits to the insert, inserting the disposable brew basket into the electric coffee brewing machine; brewing a single cup of coffee with the electric coffee brewing machine. The method further includes disassembling the basket, removing the filter with coffee therein and discarding the same while retaining the basket for reuse.

BRIEF DESCRIPTION OF THE DRAWINGS

FIG. 1 shows a perspective exploded view of the invention.

FIG. 2 shows a top view of the invention with hidden lines.

FIG. 3 shows a side sectional view through a top of the invention.

FIG. 4 shows a side sectional view through an insert of the invention.

FIG. 5 shows a side sectional view through a basket retainer of the invention.

FIG. 6 shows a top perspective view of the invention.

FIG. 7 shows a bottom perspective view of the invention.

FIG. 8 shows a side view of the invention.

DETAILED DESCRIPTION OF PREFERRED EMBODIMENTS

Figure 9:
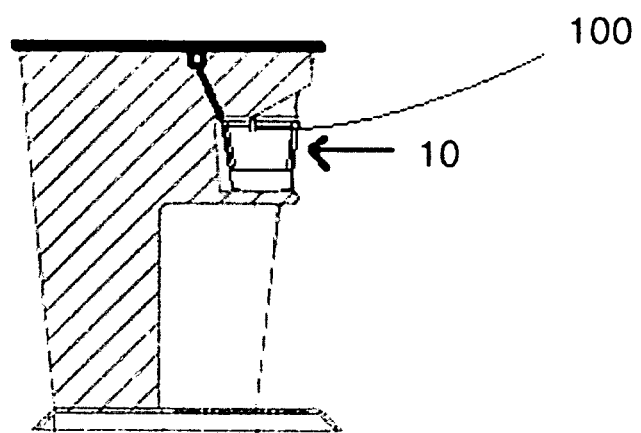
FIG. 9 is a schematic showing an aspect of the invention.

Referring now to the drawings, a coffee filter basket is generally referred to by the numeral 10. The basket 10 includes a filter retainer 12 having an outer shell 14 with an upper end 16 having open top and a bottom 18 including a generally centrally located opening therein. The opening of the bottom 18 is preferably large enough to permit insertion of one's finger therethrough. An insert 20 is provided having an upper collar 22 of a less than the diameter of the upper end 16 of the retainer 12 to fit therein and has a lower extension 24 (which can include a plurality of fingers). A filter 30 can be cup shaped and disposed within the retainer 12 and the insert 20 disposed within the filter 30 such that the insert 20 press-fits within the retainer 12 to retain the filter 30 adjacent the retainer shell 14 in a sandwich relation. The filter 30 should be of a strength to withstand pressure from water injection from a coffee maker.

Further, the upper collar 22 can include a peripheral lip 28 of a diameter at least that of the upper end 16 of the retainer 12, and preferably larger, to aid in removal of the insert 20. The peripheral lip 28 can include a cut-off edge 29 to aid in separation from lip portion 42.

A removable top 40 is provided which has outer perimeter lip portion 42 with a diameter of at least that of the diameter of the upper end 16 of the retainer 12 and has a lower collar portion 44 of a diameter less than the diameter of the upper collar 22 and configured to press-fit therein to secure the insert 20 within the retainer 12. The removable top 40 has an opening therethrough which can preferably be centrally located and which is of a size to receive a water delivery conduit therethrough in a substantially seal tight manner to prevent water backing out the opening in top 40. In this regard a seal (not shown) may be provided about the conduit to abut about the opening and conduit to prevent back flow.

Further, the lower collar portion 44 of the top 40 and the collar 22 of the insert 20 can be formed with a complementary detent mechanism to snap fit together and secure the two together for use and removal. By way of example, the collar portion 44 can include a radial protrusion 46 and the collar 22 can include an inner radial recess surface 26 to form the snap-fit relation. While cut-off edge 29 is shown, it is contemplated that an edge of either of the peripheral lip 28 of the insert 20 or the lip portion 42 of the top 40 can be recessed or extended to aid in separation of the two once connected.

A method of brewing a single cup of coffee comprises the steps of: providing an electric coffee brewing machine; providing a single-use, reusable brew basket a filter retainer having an outer shell with an upper end having open top and a bottom including an opening therein, an insert having an upper collar of a less than the diameter than the upper end of the retainer to fit therein and having a lower extension which when a filter is disposed within the retainer and the insert is disposed within the filter, the insert press-fits within the retainer to retain the filter adjacent the retainer shell, and a removable top having an outer perimeter lip portion of at least that of the diameter of the upper end of the retainer and a lower collar portion of a diameter less than the diameter of the upper collar and configured to press-fit therein to secure the insert within the retainer, wherein the removable top has an opening therethrough, inserting a single-use coffee filter into the retainer, placing the insert into the filter in a manner to cause the same to be press-fit against the retainer, disposing a single-use coffee filter between the retainer and the insert in a manner to cause the same to be press-fit therebetween; putting coffee into the filter; and brewing a single cup of coffee with the electric coffee brewing machine and brewing a single cup of coffee with the electric coffee brewing machine. The method further includes disassembling the basket, removing the filter with coffee therein and discarding the same while retaining the basket for reuse. In this way, a single-use filter 30 can be employed with coffee therein and discarded after its use.

The preferred embodiment is intended for illustrating only and is not intended for limiting the claims. As such, modifications, derivations and improvements are to be covered by the appended claims hereto.

What is claimed is:

1. A reusable filter basket for containing ground coffee for use with a single use filter for use in a single cup brewer having a water delivery conduit, comprising:
    a filter retainer of a configuration to fit with the single cup brewer having an upper end having open top and a bottom including an opening therein and a continuous side wall interconnecting said upper end and said bottom and wherein said bottom opening is of a size to permit one's finger to be inserted therethrough;
    an insert defining an opening through which fluid passes, said insert having an upper end of a diameter less than a diameter of said upper end of said filter retainer to fit therein and having a lower extension in spaced relation to said continuous side wall which when the filter which has a bottom portion and a continuous upper extending wall portion is disposed within said filter retainer, and said insert is disposed within the filter, said lower extension of said insert can fit within and adjacent the continuous upper extending wall portion of the filter and within said filter retainer to retain the filter adjacent said continuous side wall of said filter retainer; and
    a removable top having an outer perimeter lip portion with a diameter approximate that of the diameter of said upper end of said filter retainer and a lower collar portion of a diameter less than the diameter of said upper end of said insert, and said lower collar portion of said top and said upper end of said insert are configured with a complementary detent mechanism to snap fit together and secure said insert within said filter and said filter retainer for use and removal, and wherein said filter retainer, said insert and said top interconnect and said removable top has an inner opening therethrough of a size and configuration to enable receipt of the water delivery conduit of the single cup brewer in a manner to prevent back flow.

2. The reusable filter basket of claim 1, wherein said insert includes a lip portion at least that of the diameter of said upper end of said filter retainer.

3. The reusable filter basket of claim 1, wherein said lower extension includes a plurality of fingers.

4. The reusable filter basket of claim 1, wherein said bottom of said filter retainer includes an annular collar which extends radially inward therefrom defining said bottom opening which aids to retain said filter.

5. The reusable filter basket of claim 1, wherein said upper end of said insert includes a peripheral lip of a diameter at least that of the upper end of said filter retainer to aid in removal of said insert.

6. The reusable filter basket of claim 5, wherein an edge of one of said peripheral lip of the insert and said lip portion of the top is one of recessed and extended to aid in separation of the two once connected.

7. The reusable filter basket of claim 2, wherein one of the lip portion of said insert and said outer perimeter lip portion of said removable top has one of a tab and cutaway to aid in separation of said top and said insert once connected.

8. A single cup brewing method comprises the steps of:
    (a) providing a single cup brewing machine having a water delivery conduit for water injection into a filter;
    (b) providing a reusable single cup brew basket having a reusable filter retainer configured to fit with the single cup brewing machine and having an upper end having open top and a bottom including an opening therein and a continuous side wall interconnecting said upper end and said bottom, a single use filter having a bottom portion and a continuous upper extending wall portion, a reusable insert defining an opening through which fluid passes, said insert having an upper end of a less diameter than a diameter of said upper end of said reusable filter retainer to fit therein and having a lower extension which when said single use filter is disposed within said reusable filter retainer and said insert is disposed within single use filter, said insert fits within said reusable filter retainer with its lower extension adjacent said continuous upper extending wall portion to retain said single use filter adjacent said continuous side wall of said filter retainer, and a removable top having an outer perimeter lip portion of at least that of the diameter of said upper end of said reusable filter retainer and a lower collar portion of a diameter less than the diameter of said upper end of said insert and configured to fit therein and to secure said insert within said reusable filter retainer, wherein said filter retainer, said insert and said top interconnect and said removable top has an opening therethrough of a size and configuration to receive the water delivery conduit of the single cup brewer in a manner to prevent back flow;

(c) disposing the single use filter between said reusable filter retainer and said insert in a manner to cause the continuous upper extending wall portion of the filter to be press-fit therebetween;

(d) subsequent to step (c) providing ground coffee into the filter;

(e) subsequent to step (d) connecting the removable top onto said reusable retainer such that said lower collar portion fits to said insert;

(f) subsequent to step (e) inserting said reusable brew basket into the single cup brewing machine and brewing a single cup with said brewing machine; and (g) removing said single use filter by inserting one's finger through said bottom opening and pushing out said single use filter with used ingredients therein.

9. The method of claim 8, which further includes disassembling said basket, removing said single use filter with ingredients therein and discarding the same while retaining said basket for reuse.

\* \* \* \* \*